March 1, 1966  T. F. HELMS  3,237,980
CYLINDRICAL OBJECT CLAMPING DEVICES
Filed April 6, 1964  3 Sheets-Sheet 1
FIG. 1
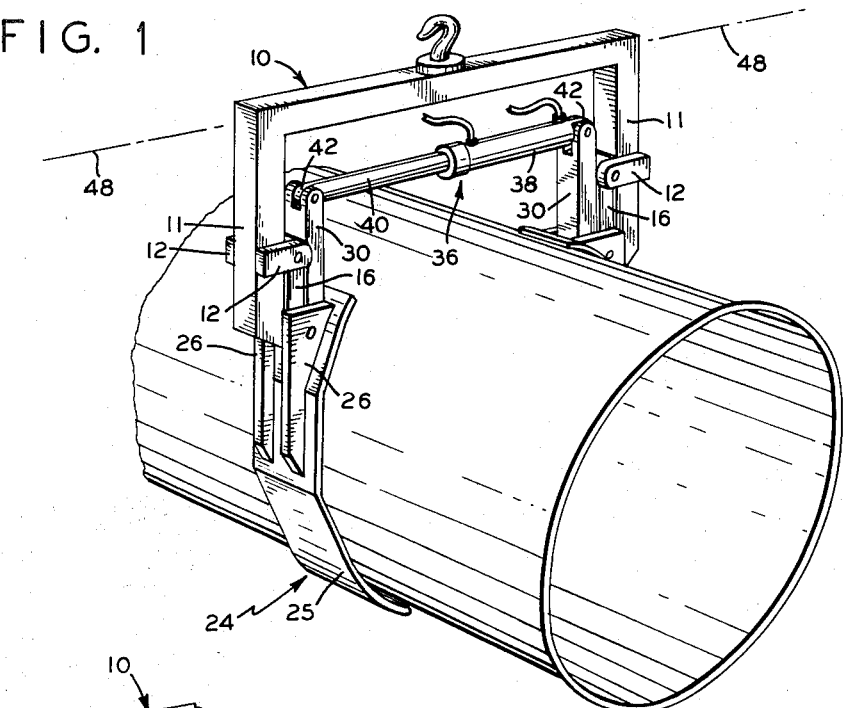
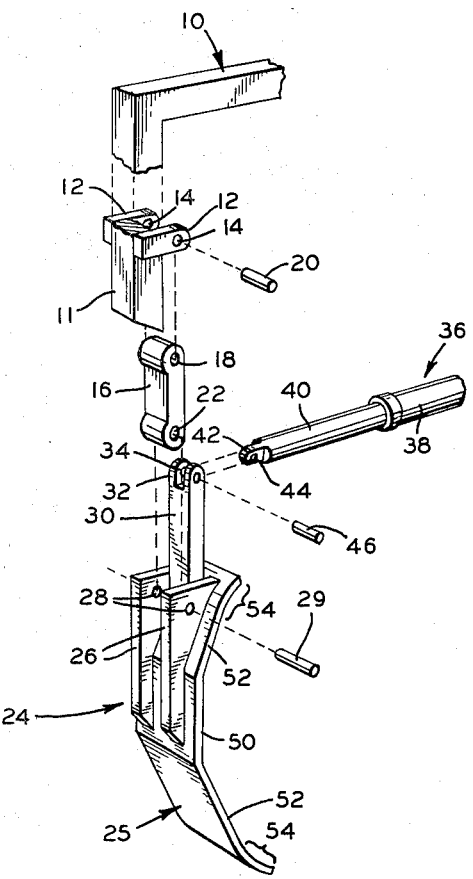
FIG. 2
*INVENTOR.*
THOMAS F. HELMS
BY
ROBERT H. WARE
ATTORNEY.

March 1, 1966  T. F. HELMS  3,237,980
CYLINDRICAL OBJECT CLAMPING DEVICES
Filed April 6, 1964  3 Sheets-Sheet 2

INVENTOR.
THOMAS F. HELMS
BY
ROBERT H. WARE
ATTORNEY.

March 1, 1966  T. F. HELMS  3,237,980
CYLINDRICAL OBJECT CLAMPING DEVICES
Filed April 6, 1964
3 Sheets-Sheet 3

INVENTOR.
THOMAS F. HELMS
BY
ROBERT H. WARE
ATTORNEY.

United States Patent Office 3,237,980
Patented Mar. 1, 1966

1

3,237,980
CYLINDRICAL OBJECT CLAMPING DEVICES
Thomas F. Helms, New Fairfield, Conn., assignor to Country Engineering Inc., Danbury, Conn.
Filed Apr. 6, 1964, Ser. No. 357,429
7 Claims. (Cl. 294—81)

The present invention relates to clamping devices for grasping and holding cylindrical objects, and more particularly to releasable clamping mechanisms adapted to seize, hold, lift or rotate and release cylindrical objects, such as large pipes, storage drums, thin-walled tubes or the like.

Prior gripping devices for drums and other cylindrical objects have many disadvantages. They cannot grasp round cylindrical objects of widely different sizes, and different clamping mechanisms must be used for different-sized objects. They generally provide inadequate gripping surfaces, and when their curved clamping jaws extend far enough to provide an adequate gripping span or surface, the objects to be handled must be substantially spaced apart to permit such gripping jaws to reach between them for selection of the object to be gripped and raised.

Furthermore, conventional gripping mechanisms for thin-walled cylindrical objects provide no safeguards against deforming and crushing the object's walls, since the clamping force applied by these conventional mechanisms is not limited or reduced during their operating cycle, as the clamping jaws approach each other.

Accordingly, a principal object of the present invention is to provide gripping and clamping mechanisms for cylindrical objects providing ample gripping surface while permitting close spacing of the objects handled.

Another object of the invention is to provide gripping mechanisms for thin-walled objects incorporating safeguards against deforming or crushing objects during handling.

Another object of the invention is to provide gripping mechanisms for cylindrical objects capable of handling a variety of different-sized objects.

Another object of the invention is to provide gripping mechanisms adaptable for holding, rotating and repositioning clamped cylindrical objects and capable of being powered either by external power supply sources or by power supply sources integrally mounted upon the mechanism.

FIGURE 1 is a perspective view of a clamping device incorporating the present invention, shown in its closed clamping position holding a cylindrical object;

FIGURE 2 is a fragmentary exploded perspective view of one portion of the clamping device shown in FIGURE 1;

2

Figure 9:
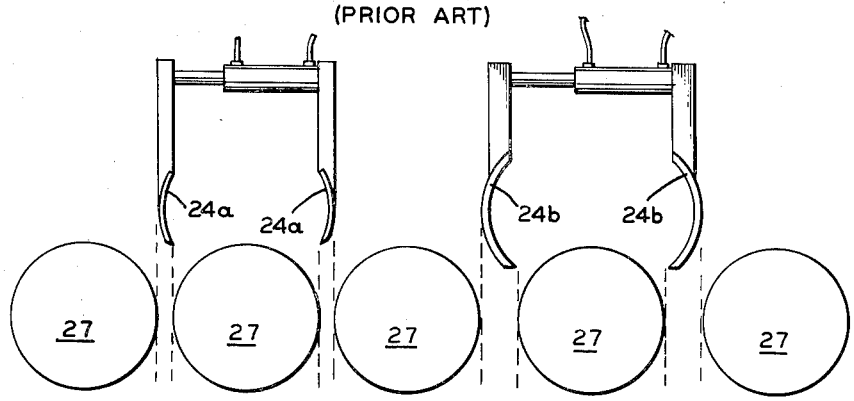

FIGURE 9 is a similar schematic end elevation view of an arrayed series of cylindrical objects in position to be gripped by two schematically-indicated prior art clamping devices.

Similar reference characters refer to similar parts in each view of the drawings.

The clamping devices of the present invention all incorporate a pivoted swinging link providing two different pivoting axes which are alternatively employed in different operating modes of the mechanism. The principal components of these clamping devices are shown in FIGURES 1 and 2, and they include the double-armed supporting yoke 10, the swinging links 16, the clamping jaws 24 with their integral protruding actuators 30, and the extensible cylinder assembly 36 joining the two actuators 30 of the opposed clamping jaws 24.

These component elements of the clamping devices are shown assembled in FIGURE 1, and their pivoting articulated relationships are shown in the exploded view of FIGURE 2.

Dual mode operation

Figure 3:
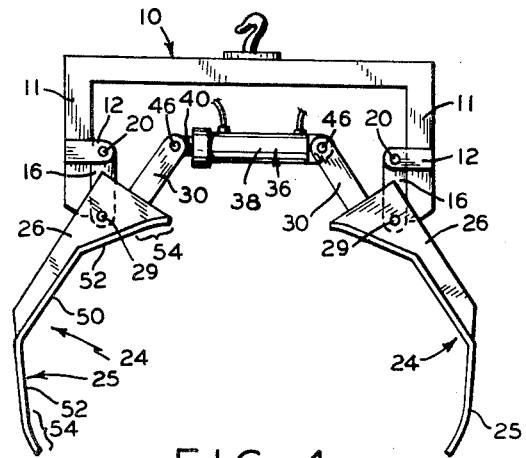
FIGURES 3, 4, 5 and 6 are schematic front elevation views showing the clamping device of FIGURE 1 in four different operating positions.

Different successive positions in the operating cycle of the clamping device are illustrated in FIGURES 3, 4, 5 and 6. In FIGURE 3 the extensible cylinder assembly 36 is fully retracted, drawing the protruding actuators 30 of the opposed clamping jaws together and pivoting the jaws 24 about the lower end of the swinging links 16 for maximum spacing of the jaws 24.

Figure 4:
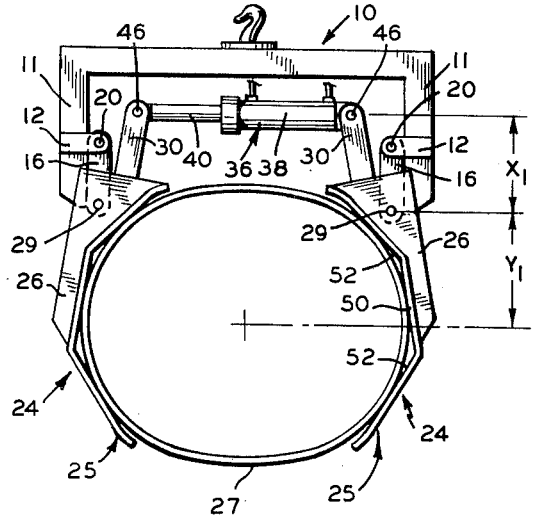

In a succeeding position, illustrated in FIGURE 4, the extensible cylinder assembly 36 is partially extended and has moved the protruding actuators 30 apart, swinging the jaws 24 toward each other about the lower ends of the links 16. In the position shown in FIGURE 4, the jaws 24 contact the peripheral surface of a deformed cylindrical object, such as a slightly flattened oil drum 27. In this figure the clamping jaws 24 grip the periphery of the cylindrical object at positions spanning its larger diameter.

In the positions shown in FIGURES 3 and 4, the swinging links 16 are bottomed against the facing surfaces of protruding arms 11 of yoke 10. Therefore the pivoting movement of jaws 24 produced by the extensible cylinder assembly 36 rotates jaws 24 about pivot pins 29 anchored at the lower, free ends of links 16. The resulting leverage ratio takes full advantage of the actuating force produced by assembly 36 in this heavy duty or "deforming" mode of the mechanism.

Figure 5:
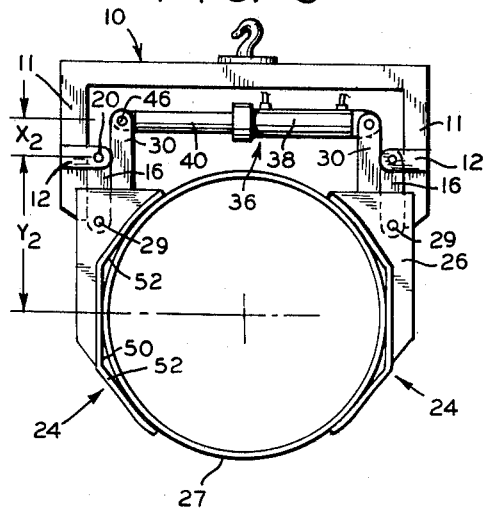

In the position shown in FIGURE 5, the extensible cylinder assembly 36 is further extended, further separating the actuators 30 to bring them into abutting relationship with the upper ends of the swinging links 16, and pivoting the clamping jaws 24 into closer juxtaposition about a smaller cylindrical object 27.

Figure 6:
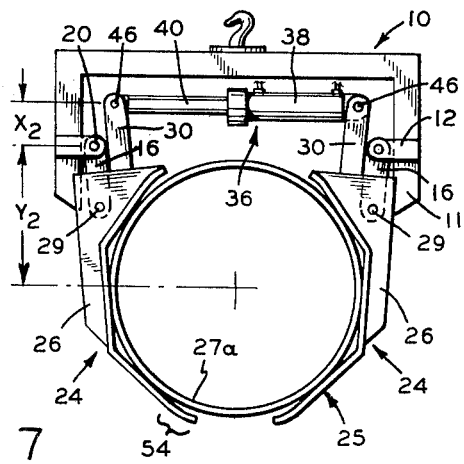

Further extension of the extensible cylinder assembly 36 is illustrated in FIGURE 6, where the further separation of the actuators 30 while each remains in abutting relationship with its swinging link 16 causes each jaw 24 with its actuator 30 and its link 16 to pivot together as an integral unit about the upper end of its link 16. This provides a greatly reduced leverage ratio in the light duty or "clamping" mode of operation.

In the positions shown in FIGURES 3 and 4, where the swinging links 16 are in abutting relationship with protruding arms 11 of the yoke 10, the "lever arms" or "moment arms" of the pivoted clamping jaws 24 are indicated by the letters $X_1$ and $Y_1$ in FIGURE 4. Distance $X_1$ is the moment arm of the opposed forces supplied by the extensible cylinder assembly 36, acting to swing the integral actuators 30 about the lower ends of links 16, and distance $Y_1$ is the moment arm of the resisting forces exerted by the clamped cylindrical member 27 upon the clamping jaws 24, also acting to pivot jaws 24 about the lower ends of swinging links 16.

In the positions shown in FIGURES 5 and 6, in which the clamping jaws 24 pivot about the *upper* end of swinging links 16 the moment arms are identified as $X_2$ and $Y_2$. In this case $X_2$ is very much smaller than $Y_2$, greatly reducing the crushing deformation produced in the clamped cylindrical object by a comparable extension increment of the extensible cylinder assembly 36 in the light duty mode illustrated in FIGURE 6, as compared to the heavy duty mode illustrated in FIGURE 4.

*Articulated construction*

The structural details of the clamping mechanisms of this invention are best seen in the exploded view of FIGURE 2, as compared with the assembly view of FIGURE 1. The supporting yoke 10 is provided with opposed yoke arms 11, protruding in the direction of the object to be seized and clamped. Each arm 11 is provided at an intermediate point with a pair of inwardly extending ears 12 pierced by aligned pivot holes 14.

Interposed between each pair of ears 12 is one end of the swinging link 16 incorporating a pivot hole 18 which is aligned with the pivot holes 14 and anchored for pivoting movement therein by a pin 20 held in position in holes 14 and 18 by C-clips in terminal grooves or other suitable retaining means. The free end of each swinging link 16 is provided with a similar transverse pivot hole 22 for pivoting articulated connection with the clamping jaws 24.

Each clamping jaw 24 includes a clamping plate 25 shaped to conform generally to the cylindrical periphery of the object to be seized and held in the releasable clamping devices of this invention. Two reinforcing ribs 26 protrude outwardly from the convex outer surface of each clamping plate 25 and the ribs 26 are provided with aligned pivot holes 28. Swinging link 16 fits between the ribs 28 with its pivot hole 22 aligned with the holes 28 and pivotally anchored therein by a retained pivot pin 29.

An integral actuator 30 extends from the clamping jaw 24 past swinging link 16 in the direction of yoke 10. The extreme end of actuator 30 is forked to provide flanges 32 pierced by aligned pivot holes 34. The pivot holes 12, 18, 22, 28 and 34 all preferably have their axes aligned substantially parallel with each other and also with the corresponding pivot hole axes of the opposed clamping jaw mounted on the other arm 11 at the opposite side of yoke 10, as indicated in FIGURE 1.

The extensible actuating cylinder assembly 36 includes the hydraulic cylinder 38, preferably double-acting, and its telescoping ram 40 having a flange 42 extending from its extreme end and pierced by pivot hole 44 for juxtaposed alignment with pivot holes 34 in flanges 32 of the actuator 30. The remote end of hydraulic cylinder 38 incorporates a similar flange 42 (FIGURE 1) correspondingly anchored pivotally in the forked end of the opposite arm 30.

In the illustrated embodiment, the clamping plates 25 are each formed of three angularly displaced segments forming tangential or chordal sectors of the clamping plate and allowing it to surround a substantial peripheral portion of the cylindrical object being clamped. Thus in FIGURES 2 and 3 the clamping plate 25 incorporates a flat central sector 50, and two outer sectors 52 each provided with a slightly curved outer edge 54.

Thus, as indicated in FIGURE 6, an undersized cylindrical object may be seized and gripped by tangential clamping between central sectors 50 and the remote inner sectors 52 of the opposed clamping jaws 24, while, as indicated in FIGURES 4 and 5, suitably sized cylindrical objects may be tangent to the central and inner sectors or to all three sectors of the respective clamping jaws 24.

*Self-limited crushing force*

The clamping mechanisms of this invention are all limited in the amount of clamping deformation they can produce in a thin-walled cylindrical object, since their switching of pivoting clamping axes automatically reduces the clamping force applied to the object being gripped.

Initially, when the clamping plates 25 grip and begin to compress the object 27, the hydraulic pressure in cylinder 38 builds up to apply firm clamping pressure, limited only by a by-passing relief valve in the hydraulic system. Unit stresses produced in object 27 are small because of the large area of the sectored clamping plates 25.

The clamping force exerted on object 27 in the heavy-duty mode illustrated in FIGURE 4 is essentially equal to the actuating force applied by the extensible cylinder assembly 36, since the actuating cylinder moment arm $X_1$ is approximately equal to the clamping jaw moment arm $Y_1$ about the lower pivot pin 29, pivotally anchoring lower pivot hole 22 of swinging link 16 to the aligned pivot holes 28 in ribs 26 of clamping jaw 24.

With further extension of the extensible actuating cylinder assembly 36, as indicated in FIGURE 5, an out-of-round elliptically deformed cylindrical object 27 may be reshaped into the substantially circular for shown in FIGURE 5 by the clamping force of jaws 24. As shown schematically in FIGURE 4 the reshaping force available to deform an out-of-round object, such as a crushed-in oil drum, is much larger than the normal clamping force illustrated schematically in FIGURE 5, and the reshaping force is applied only in the heavy-duty mode until pivoting closure of jaws 24 about pins 29 brings actuators 30 against links 16. Thereafter jaws 24 pivot about pin 20, reducing clamping leverage from the 1:1 ratio of FIGURE 4 to the 1:5 ratio of FIGURE 5.

Thus the heavy reshaping force is applied and successively deforms the clamped object 27 yieldingly only until the integral actuators 30 of the clamping jaws 24 both seat themselves in abutting relationship against their respective swinging links 16, as shown in FIGURE 5, switching the mechanism from its heavy-duty "deforming" mode to its light-duty "clamping" mode.

Further extension of the extensible cylinder assembly 36, shown in FIGURE 6, causes further pivoting movement of the actuators 30, rocking them about the upper pivot hole 18 anchored by pivot pin 20 in aligned holes 14 between ears 12 on the yoke 10, causing clamping jaw 24 to pivot as a unit with its link 16 held in rigid, abutting position, about the axis of the upper pivot pin 20. Therefore, as shown in FIGURE 6, the moment arm of the actuating force applied by extensible cylinder assembly 36 in this light-duty "clamping" mode is now the reduced length $X_2$ between the axis of pivot pin 20 and the axis of pivot pin 46 through which the assembly 36 applies its actuating force.

The moment arm of the clamping force applied by the clamping jaw 24 is correspondingly increased to the larger value $Y_2$, the distance from the pivot pin 20 to the effective axis along which the clamping force is applied by the clamping jaws 24 to the clamped cylindrical object 27a.

The changeover from the heavy-duty "deforming" mode illustrated in FIGURE 4 to the light-duty "clamping" mode illustrated in FIGURE 6 occurs at the preselected clamping jaw separation position shown in FIGURE 5 at which the actuators 30 integral with the jaws 24 reach the seated, abutting position against swinging links 16 shown in FIGURE 5. By designing the device with appropriate dimensions, this changeover clamping jaw position is predetermined to reshape and deform the objects only to the preselected diameter, corresponding to the deformation produced in a perfectly-shaped object by the optimum clamping force. The jaws can be closed further only by pivoting actuation in the light-duty low leverage ratio clamping mode, in which the reduced clamping force is easily resisted by the clamped object to limit further deformation.

Flexible adjustability

Figure 7:
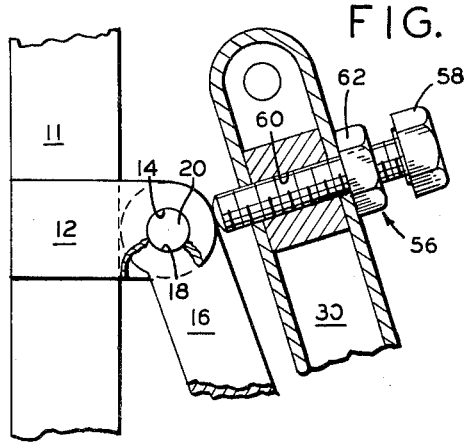
FIGURE 7 is a fragmentary front elevation view, partially in section and greatly enlarged, of a portion of the clamping device shown in FIGURE 1 incorporating a modification thereof.

The amount of clamping jaw separation corresponding to this changeover position, at which the clamping force is reduced from a heavy-duty force to light-duty force, may be changed in the modified version of the invention incorporating the adjustable seating stop 56 illustrated in FIGURE 7.

The stop 56 includes an adjustable machine screw 58 threaded into a tapped hole 60 in the upper end of actuator 30 close to the axis of pivot pin 20 anchoring swinging link 16 to ear 12. By changing the threaded position of a stop nut 62, which is mounted on the threads of the machine screw 58 and brought into jamming engagement with the actuator 30, the adjusted position of the machine screw 58 may be varied and relocked to provide the precise desired clamping jaw spacing at which clamping force is reduced.

By means of this modification, the amount of deformation produced in thin-walled cylindrical objects clamped by these devices may be limited to different selectable predetermined values, with further clamping closure of the clamping jaws being possible only through the exertion of smaller clamping force, insufficient to produce further deformation or crushing of the clamped cylindrical object. By this means, thin-walled cylindrical objects may be deformed efficiently to assure excellent gripping contact with the clamping device, without danger of over-deformation or crushing of the thin walls of the clamped object.

Rotating and repositioning clamped objects

The clamping devices of this invention are well adapted for incorporation in dumping, upending or reversing frames mounted on fork lift trucks, overhead traveling cranes, or other materials handling systems. For example, the clamping device of FIGURE 1 may be mounted in a rotating frame causing it to rotate about an axis 48 passing through the upper bridge member of yoke 10 and permitting the cylindrical object 27 to be seized and clamped whether it is stored in a vertical or a horizontal position, while also allowing a change of this position during the holding of the cylindrical object. Thus a hollow, open-ended drum may be picked up and inverted for dumping; a sealed drum of solid-liquid suspension may be picked up, inverted and set down again to reduce settling of the solid contents, and cylindrical objects of all kinds may be shifted and restacked in either vertical or horizontal array with maximum convenience.

Figure 8:
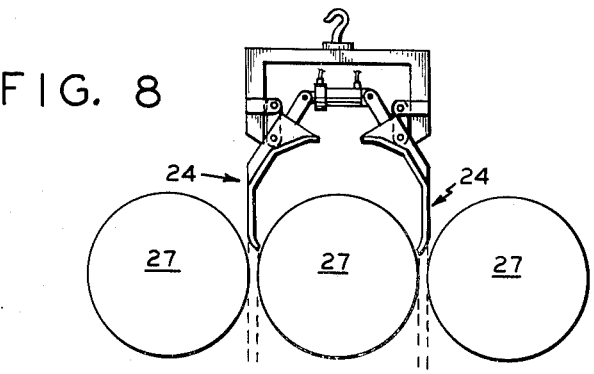
FIGURE 8 is a schematic end elevation view showing an arrayed series of cylindrical objects, with the centermost object being gripped by a clamping device of the present invention, illustrating the close spacing of objects made possible by this invention.

A comparison of FIGURES 8 and 9 illustrates an additional advantage of the present invention. As shown in FIGURE 5, the clamping span of clamping jaws 24 surrounds a large portion of the periphery of object 27. The articulated arrangement of the clamping jaws 24 allows them to be inserted through an extremely narrow space between the arrayed objects 27, which therefore may be stored close together. In FIGURE 9 on the other hand, a comparable close spacing of the arrayed objects 27 as shown at the left side of the figure permits the use of very small and only slightly curved clamping plates 24a, when these plates are mounted on a non-articulated, prior art clamping device. Similarly, as shown at the right side of FIGURE 9, a prior art clamping device providing adequate "wraparound" or clamping span by employing a larger chordal sector for the clamping plates 24b necessarily requires wider separation between the arrayed objects 27 for insertion of the curved plates 24b, as indicated by the dashed lines on the right side of FIGURE 9.

A comparison of FIGURE 9 with the schematic diagram of FIGURE 8 showing the operation of the clamping devices of this invention makes evident the fact that articulation of clamping jaws 24 permits them to slip between the objects 27 closely spaced together, and to provide ample clamping span or area largely surrounding and firmly gripping the objects as in FIG. 5.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:
1. A releasable clamping device for gripping cylindrical objects comprising, in combination:
   A. a supporting yoke provided with two opposed protruding arms,
   B. a swinging link associated with each protruding arm and having one end pivotally joined to its protruding arm at an intermediate point therealong for swinging movement toward and away from the outermost portion of the arm,
   C. a clamping jaw associated with each swinging link and pivotally anchored thereto for rocking pivotal movement incorporating an integral actuator protruding from the clamping jaw beside and beyond its swinging link and the intermediate pivot point on its arm toward the supporting yoke,
   D. and extensible actuating means connected pivotally to a free end of each actuator near the yoke to rock both clamping jaws toward and away from each other upon command.

2. The clamping device defined in claim 1 wherein the axes of pivotal movement of the swinging links and the clamping jaws are all substantially parallel.

3. A releasable clamping device for gripping cylindrical objects comprising, in combination:
   A. a supporting yoke provided with two opposed protruding arms,
   B. a swinging link associated with each protruding arm having one end pivotally joined to its protruding arm at an intermediate point therealong for swinging movement toward and away from the outermost portion of the arm,
   C. a clamping jaw associated with each swinging link and pivotally anchored thereto for rocking pivotal movement incorporating an integral actuator protruding from the clamping jaw beside and beyond its swinging link and the intermediate pivot point on its arm toward the supporting yoke,
   D. and extensible actuating means connected pivotally to a free end of each actuator near the yoke to rock both clamping jaws toward and away from each other upon command
      (1) from a released position wherein the clamping jaws are rocked open to urge the swinging links toward their respective arms
      (2) through a range of closing positions
      (3) to a range of clamped positions wherein the clamping jaws are rocked together to urge the swinging links away from their respective arms and toward each other.

4. The combination defined in claim 3 wherein the length of the swinging link is selected to space the axis of rocking pivotal jaw movement away from the intermediate point, substantially reducing the clamping leverage and the clamping force exerted by the clamping jaws in their clamped positions as compared with the leverage and clamping force produced in the closing positions.

5. A releasable clamping device for gripping the cylindrical objects comprising, in combination:
   A. a supporting yoke provided with two opposed protruding arms,
   B. a swinging link associated with each protruding arm having one end pivotally joined to its protruding arm at an intermediate point therealong for swinging movement toward and away from the outermost portion of the arm,
   C. a clamping jaw associated with each swinging link with
      (1) a protruding clamping plate extending away from the yoke beyond the protruding arms,
      (2) an actuator extending toward the yoke between the protruding arms,
      (3) and means pivotally joining its swinging link to the clamping jaw at a point between the clamping plate and the actuator,
   D. and actuating means connected to move the actuators of both clamping jaws toward and away from each other upon command.

6. A releasable clamping device for gripping cylindrical objects comprising, in combination:
   A. a supporting yoke provided with two opposed protruding arms;
   B. a swinging link associated with each protruding arm having one end pivotally joined to its protruding arm at an intermediate point therealong for swinging movement toward and away from the outermost portion of the arm;
   C. a clamping jaw associated with each swinging link with
      (1) a protruding clamping plate extending away from the yoke beyond the protruding arms,
      (2) an actuator extending toward the yoke between the protruding arms,
      (3) and means pivotally joining its swinging link to the clamping jaw at a point between the clamping plate and the actuator;
   D. and actuating means connected to move the actuators of both clamping jaws
      (1) from a released position in which the actuators are closest together,
      (2) through various intermediate closing positions in which the actuators are farther apart,
      (3) to a predetermined clamping position at which each actuator is seated in abutting contact with its respective swinging link near the central point on its protruding arm.

7. A releasable clamping device for gripping cylindrical objects comprising, in combination:
   A. a supporting yoke provided with two opposed protruding arms,
   B. a swinging link associated with each protruding arm having one end pivotally joined to its protruding arm at an intermediate point therealong for swinging movement toward and away from the outermost portion of the arm,
   C. a clamping jaw associated with each swinging link with
      (1) a protruding clamping plate extending away from the yoke beyond the protruding arms,
      (2) an actuator extending toward the yoke between the protruding arms,
      (3) and means pivotally joining its swinging link to the clamping jaw at a point between the clamping plate and the actuator,
   D. and actuating means pivotally joined to the actuators of both clamping jaws and movable
      (1) from a released position in which the actuators are closest together,
      (2) through a predetermined seated position at which the actuators are pivotally spaced apart and in abutting contact with their respective swinging links,
      (3) to a clamping position wherein the actuators are pivotally spaced further apart, drawing their respective swinging links into pivoting displacement about the intermediate point to reduce the clamping force while increasingly deforming the clamped object until it exerts a resisting force balancing the clamping force.

References Cited by the Examiner

UNITED STATES PATENTS

| 2,715,787 | 8/1955 | Williams | 294—88 X |
| 3,044,819 | 7/1962 | Pierre | 294—88 |
| 3,154,339 | 10/1964 | Kaplan | 294—113 X |

GERALD M. FORLENZA, *Primary Examiner.*

HUGO O. SCHULZ, *Examiner.*

G. F. ABRAHAM, *Assistant Examiner.*